United States Patent Office 3,372,129
Patented Mar. 5, 1968

3,372,129
METHOD OF PREPARING POLYAMINES
Kenneth G. Phillips, North Riverside, Ill., assignor to Nalco Chemical Company, Chicago, Ill., a corporation of Delaware
No Drawing. Filed Oct. 6, 1964, Ser. No. 401,964
10 Claims. (Cl. 260—2)

ABSTRACT OF THE DISCLOSURE

A process of making high molecular weight polyamines which are characterized as being substantially non-cyclic in structure.

---

The instant invention is concerned with a method of preparing polyamines and resultant products therefrom. More specifically, the present invention is directed toward a process of preparing polyamines of relatively high molecular weight by a novel reaction of an amine and an alkylene dihalide.

Prior art methods of preparing polyamines via reaction of a lower amine and an alkylene dihalide have certain drawbacks. Most importantly, when one follows known synthetic techniques involving a reaction of this type, only products of relatively low average molecular weight are achieved. For example, reaction of ammonia and ethylene dichloride via known procedures results in a mixture of polyamines in which there is present a substantial proportion of lower polyamines such as ethylene diamine, diethylene triamine, etc. Adjustment of certain process variables such as molar ratio, pressure, temperature, etc., does not overcome the inherent deficiencies of the reaction in only polymerizing to a certain minimal degree. The same situation is noted with respect to reaction of lower polyamines and alkylene dihalides. A large percentage of the mixture of polyamine products are composed of only 2 or 3 mer units. In like manner, since polyquaternary compounds are generally prepared from polyamines, relatively high molecular weight quaternaries have heretofore also been commercially unavailable.

In many instances it is extremely desirable that a synthesized polyamine have a relatively high molecular weight. This is due to the fact that effectiveness of resultant end use of the polyamine often depends, at least in part, upon its molecular weight. For example, it is generally felt that efficiency of coagulation by employment of polyamine compounds is directly proportional in many cases to their extent of polymerization expressed in terms of molecular weight. The higher molecular weight materials then generally show greater activity as coagulants.

One excellent method of preparing high molecular weight polyamines, easily separable from the inorganic salt constituent, is described in co-pending application filed Nov. 20, 1963, having Ser. No. 325,126, now abandoned. However, while higher molecular weight products have been achieved than heretofore possible via a relatively simple procedure, theoretical limits of molecular weight ranges of condensation polymers have not yet been achieved. Progress in the art would be further promoted by discovery of a new and improved method of achieving even higher molecular weight polyamines than those realized from the method described in the just cited application or other prior art processes.

Moreover, it has been subsequently discovered that the synthetic method disclosed in the above co-pending application produces polymeric polyamines which have a substantial proportion of cyclic structures. Since it has been further determined that in some instances measurable ring formation in the overall polymeric polyamine configuration has a tendency to reduce activities of such materials in certain coagulation processes, the process is somewhat deficient in this aspect. It would therefore be extremely advantageous to produce high molecular polyamines essentially non-cyclic in structure.

In summary, it would be of benefit to the art if a method were devised of synthesizing polyamines and polyquaternaries of higher molecular weights than heretofore achieved via prior art techniques. Also, if the process could be controlled whereby substantially all the product is non-cyclic in nature, such method would be extremely useful. It therefore becomes an object of the invention to provide a method of producing relatively high molecular weight polyamines and polyquaternaries.

Another object of the invention is to provide a process of producing such polynitrogen products through a simple, easily followed technique whereby essentially all non-cyclic molecular configuration is realized.

Yet another object of the invention is to provide non-cyclic polyamine products and quaternary derivatives thereof made from an amine and an alkylene dihalide by following a closely controlled special polymerization technique, which organic polynitrogen substances show excellent effectiveness in promoting coagulation of suspended particles.

A specific object of the invention is to provide a method of reacting ammonia and ethylene dichloride to produce a desired organic polyamine of relatively high molecular weight range, having little, if any, ring structures.

Other objects will appear hereinafter.

In accordance with the invention, a method of producing high molecular weight polyamines has been discovered, from which polyamines high molecular polyquaternaries can also be synthesized. In its broadest aspect the process includes the steps of reacting an alkylene dihalide and an amine. The amine reactant has the following sturctural formula:

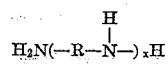

where R is an alkylene radical selected from the group consisting of

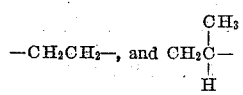

and x is an integer of 0–5. R, when present, is preferably an ethylene radical. Preferred reactants are ammonia, ethylene diamine, diethylene triamine, tetraethylene pentamine and triethylene tetramine. Of these, the most preferable due to excellent reactivity, low cost and availability is ammonia.

The alkylene dihalide reactant may be chosen from a wide variety of difunctional organics. Preferred among these are ethylene dichloride and 1,2-propylene dichloride. Of these the most preferred is ethylene dichloride.

The reaction itself should be carried out under carefully controlled conditions. The temperature of reaction ranges from about 75° to about 200° C. The polymerization is effected under a pressure of 75–1000 p.s.i. The reaction is accomplished by slowly introducing an amine into a reaction zone at a rate sufficient to maintain a fixed predetermined pressure within the above limits. Simultaneously, an alkylene dihalide is introduced into the reaction zone at a rate sufficient to maintain a fixed pre-determined temperature within the aforementioned limits. Sufficient water should be initially introduced into the reaction zone so that reaction will occur in the liquid phase.

It has further been discovered that during at least the terminal 60% of the time of reaction, sufficient basic reagent should also be introduced into the reaction zone to maintain the reaction pH during such time between about 8.0 and 12.5. More preferably base is introduced continuously during the terminal 70% of reaction time. If such a step is followed along with the above directions, exceptionally high molecular weight polyamine products are achieved. Concurrent with this desirable quality, the products are further characterized as being substantially non-cyclic in structure. Without introduction of basic material during at least the time recited above, a substantial proportion of ring formation is realized. In many cases, as will be seen below, surprisingly increased efficiency of coagulation of certain impure liquids is achieved, if the polymeric polyamine treating agent is substantially non-cyclic, approaching a theoretical polyethylene imine type structure. If ring structures are present in the polymer such as piperazine rings, coagulation results using such ring-containing polymers in many cases are sub-standard.

The basic neutralizing agent may be chosen from a wide variety of substances having sufficient basic strength to maintain the pH of the reaction mixture between the above recited range. Preferred basic reagents are alkali and alkaline earth metal hydroxides, oxides and carbonates. Among these, the most preferred substances due to availability and high basic strength, are potassium hydroxide, calcium hydroxide and sodium hydroxide. In a greatly preferred embodiment the pH range of the polymerization reaction is maintained from about 9.0 to about 12.0. In still another embodiment of the invention, the neutralization of acid produced during the polymerization is effected during the whole of said reaction time by addition of one or more of the above recited basic neutralizers in a continuous manner.

Generally, during the reaction sufficient basic material is added so that each equivalent of acid produced by the polymerization is neutralized by one equivalent of base. Depending upon the base used, this may range from about 0.8 to about 2.2 equivalents of base per equivalent of produced acid. The basic material itself is preferably added to the reaction zone in aqueous form. Such commercially available basic material as 50% or 73% by weight of aqueous solutions of sodium hydroxide are admirably suitable in the practices of the invention.

If such above reaction conditions are followed, polyamine products of relatively high molecular weight are achieved. For example, reaction of ammonia and ethylene dichloride according to the above directions yields mixed polyamines having an average molecular weight in excess of 1000 and usually in excess of 1500. Polyamine products having a molecular weight even as high as 50,000 may be achieved.

The polymerization reaction is more preferably carried out at temperatures from about 80° C. to 140° C., and under pressures ranging from about 75 p.s.i. to about 200 p.s.i. In such cases the products have better clarity, and less color than do those formed under more stringent reaction conditions.

The above described reaction is one of an exothermic nature. Therefore, in order to more closely control the reaction and allow a higher addition rate of alkylene dihalide, it is greatly preferred that a source of external cooling be applied to the reaction zone such as by merely encasing such zone with a cooling jacket of water. In any case, whether external cooling is applied or not, the flow of alkylene dihalide is adjusted so as to maintain the temperature substantially at any point chosen from within the above-mentioned range. Likewise, the introduction of amine is controlled by a pressure regulator valve or by any other suitable method whereby the pressure is not allowed to rise or fall to a point substantially different from that particular pressure chosen from within the above-stated range.

After the reactor volume has been substantially filled with reaction product, the alkylene dihalide flow is ceased. The residual, unreacted alkylene dihalide is consumed by further reaction with the amine reactant, preferably at the same temperature and pressure as previously employed in the run. Amine introduction is then terminated and excess amine in the reactor vented to the atmosphere or used in a subsequent run. This step of reacting trace amounts of residual unreacted alkylene dihalide is generally accomplished in 5–180 minutes depending upon operating conditions. In yet another embodiment the amine flow is ceased, and additional alkylene dihalide added and reacted with residual amine for the just stated amount of time.

Since the relatively high molecular weight polyamine product itself, at the termination of the reaction, is already in a free base polyamine form, subsequent neutralization need not be effected. Thus, a separate process step is obviated making the inventive method even more attractive.

Another extremely important advantage which accrues by following the techniques of the instant invention is that a relatively highly concentrated product is formed. Reaction products having an organic content of from about 20 to 60% have been achieved and products having a polyamine content of 25–35% are easily realizable.

Another distinct advantage of the invention is that by following the above-recited practices, reactor volume may be used almost to the fullest extent, and yet, when the reaction is terminated a substantial concentration of desired organic polyamine is present. In prior art methods, involving reaction of amine and alkylene dihalide in some fixed molar ratio, a substantial proportion of the reactor volume is taken up with water. Therefore, in the instant invention greater efficiency per unit time in terms of higher organic polyamine yield per hour is realized. Thus, reactor size is utilized to a maximum efficiency in any given run in terms of useful organic yield.

As mentioned above, it is preferred that water be introduced into the reaction from the beginning of the run. If an aqueous solution of an amine such as aqueous ammonia is employed, the dissolved amine itself is introduced into the reaction zone initially and additional amine metered in to maintain pressure as it is gradually consumed in the reaction. However, water may be introduced from an independent source other than as a solvent medium for the amine reactant. For example, the reaction may be carried out whereby water is charged to the reactor, and anhydrous ammonia from an outside tank source introduced during the course of the reaction to maintain a chosen pressure. It has been determined that generally at least about 10% of the final total reaction product weight should be composed of water. A typical final solution contains about 30–50% by weight of water.

As mentioned above, a greatly preferred reaction mixture involves use of ammonia and ethylene dichloride. In one specific embodiment a dilute heel of ammonia is charged to the reactor in an amount just sufficient to allow agitation to be carried on. The heel is heated to a desired pressure and temperature within the aforementioned limits, and then ammonia and ethylene dichloride are metered in at a rate whereby this preset temperature and pressure are maintained constant. Sodium hydroxide is introduced during at least the terminal 60% of reaction time and more often during the terminal 70%. When reactor volume is completely filled with product, the reaction is terminated and the product withdrawn from the system.

The reaction itself may be carried out over a wide range of time. Of course, such variable is related directly to the size of the batch prepared as well as temperature and pressure variables. Generally, however, the reaction takes from about ½ to about 20 hours and most often is complete in 1–12 hours time. Also, if one follows the above-outlined procedure with respect to reactant feed rates, it has been determined that approximately 1–2.5 moles of amine are used up in reaction with one mole of alkylene dihalide over the course of the entire run, and more generally 1–1.5 moles of amine per mole of alkylene dihalide are expended.

The following examples illustrate the practices of the invention. It is understood, of course, that these examples are merely illustrative and that the invention is not to be limited thereto.

*Example I*

A 20-gallon glass steel reactor was set up to which was attached external sources of both anhydrous gaseous ammonia and ethylene dichloride. A pressure regulator valve was inserted in the line leading from the ammonia source to the reactor. The reactor was first charged with 28 pounds of water. This was a sufficient volume to allow good agitation with the equipment employed. The reactor was heated until the temperature reached 110° C. and the system was then pressurized with anhydrous ammonia to 95–100 p.s.i. The system was then vented to remove air, repressurized to 95–100 p.s.i. with ammonia and heated to 110° C. The pressure was maintained at the 95–100 p.s.i. level by gradual introduction of gaseous ammonia throughout the whole reaction time to replace reacted ammonia.

Ethylene dichloride was then pumped into the reactor and water cooling turned on. Initially, 15 pounds of ethylene dichloride was added over a period of one hour and fifty minutes. By introduction of the ethylene dichloride during the whole reaction the temperature of the reaction was maintained at 100–110° C. By such careful manipulation of rate of ethylene dichloride added to the system, the temperature of the exothermic reaction could be maintained relatively constant within the above recited temperature range. Upon completion of the addition of the initial 15 pounds of ethylene dichloride, an aqueous concentrate of 50% sodium hydroxide was fed into the reaction vessel in an amount of 61 pounds over three hours and 55 minutes. An additional 25 pounds of ethylene dichloride was also added during the caustic addition. Ammonia was then vented over several hours and the reaction completed by adding nine additional pounds of ethylene dichloride and sufficient sodium hydroxide to maintain the pH between about 8.5 and 11.0. At this time, the reactor had approached the capacity charge and the pumping of ethylene dichloride to the reaction zone was discontinued. The reaction was further heated for 1–2 hours to react residual ethylene dichloride. The system was then cooled and vented. The polyamine product was subjected to contrifugation and substantial amounts of sodium chloride by-product separated out from the aqueous solution of polymeric amine. Molecular weight determination of the above polyamine product demonstrated that the molecular weight was in excess of 2000 and the product contained substantially no low molecular weight polyamines such as ethylene diamine, diethylene triamine, and tetraethylene pentamine.

In a comparative run wherein the reactor was charged to capacity all at one time with the same number of absolute moles of ammonia and ethylene dichloride reactants as used above and the reaction effected under substantially the same conditions of temperature and pressure, the final product was composed of 43% tetraethylene pentamine and lower polyamine fractions, leading to a product having substantially lower molecular weight range than the subject polyamine.

In like manner, when the process of the invention was carried out but with omission of neutralization during reaction with basic reagent, the product had a substantially higher proportion of piperazine ring structure content. To determine this, carbon:nitrogen ratios of all products prepared were determined. On a theoretical basis, with respect to an ammonia-ethylene dichloride reaction, a determined ratio of carbon to nitrogen of 3:1 is a proof that the entire polymer is composed of piperazine rings. In like manner, a 2:1 ratio indicates a product having a completely non-cycle structure of the polyethylene imine type. C:N ratios of polymeric polyamine products from prior art processes range from about 2.2 to 2.5. If a product is prepared by following the directions outlined above, but the neutralization varient omitted during actual polymerization, the same phonomenon occurs. That is, the polymeric polyamines have a substantial proportion of cyclic piperazine rings and a C:N ratio within that just recited. In the instant case, when neutralization is effected and the other outlined process steps followed, the polymeric polyamines are substantially noncyclic and have a C:N ratio ranging from about 2.0 to 2.1.

*Example II*

This example was run essentially according to the directions of Example I outlined above with the exception that ethylene dichloride (60 pounds) and calcium oxide (24 pounds) were introduced continuously along with ammonia at 100 p.s.i. into a reaction zone at a temperature of 100° C., in presence of 28 pounds of water. The reaction time was approximately five hours.

*Example III*

In this example 28 pounds of water was introduced into a 20-gallon glass-lined reactor and ammonia introduced at reaction temperature of 100° C., and reaction pressure of 100 p.s.i. Five pounds of ethylene dichloride were added slowly at the above pressure and temperature and allowed to react. Following this initial ethylene dichloride addition, an additional 35 pounds was added together with 50% sodium hydroxide (70 pounds) over a period of approximately five hours. A total of 10 pounds of ammonia was employed during the total reaction time. The reactant flows were ceased, the reaction mixture stirred for thirty minutes, vented to free unreacted ammonia, and the product cooled and drummed.

*Example IV*

Twenty-eight pounds of water was introduced into a 20-gallon glass-lined reactor along with ammonia. Reaction temperature was raised to 100° C., and pressure to 100 p.s.i. Fifteen pounds of ethylene dichloride was also added slowly and allowed to react. Following the initial ethylene dichloride addition, another 35 pounds was added along with 70 pounds of 50% caustic solution over a period of approximately five hours. The reaction mixture after stirring for 30 minutes, vented to remove ammonia and an additional 10 pounds of ethylene dichloride added and vented one–two hours to yield the final product.

In order to form the polyquaternaries of the invention, it is only necessary to add sufficient alkylating agent to completely quaternize the free amine groups of the polymeric polyamines whose formation is described above. Generally, sufficient alkylating agent is added to completely quaternize the polyamine group. The amount of quaternizing reagent is easily determined by calculating the equivalent weight of the polyamine by known titration techniques, and then adding sufficient quaternizing chemical to complete the reaction. In most instances, a slight excess of quaternizing agent is added in order to drive the reaction to completion.

The organic quaternizing reactant may be chosen from a host of known organic alkylating reagents. For example, dimethyl sulfate, methyl chloride, $C_2$–$C_{22}$ alkyl halides such as ethyl chloride, propyl chloride, etc., alkaryl halides as benzyl chloride, substituted benzyl chlorides as dodecyl benzyl chloride, epihalohydrins as epichlorohydrin, lactones as beta-propiolactone, polyoxyalkylene halides, such as polyoxyethylene chloride, etc. may be employed. Preferred quaternizing agents are alkyl halides, alkyl substituted aryl halo compounds as alkyl substituted benzyl halides and alkoxy halides. Of these, benzyl chloride, methyl chloride, and dodecyl benzyl chloride are most preferred.

The quaternization reaction itself may be effected in bulk without benefit of solvent or in a variety of polar organic solvents such as alcohols, ketones, esters, etc. The quaternary product may be used in a 100% active form or in solution state. A typical polyquaternary preparation is given as follows:

*Example V*

In a 20-gallon glass-lined reactor was placed the polyamine of Example IV, along with 30 pounds of sodium carbonate. The temperature was raised to 80° C. and methyl chloride admitted via a pressure regulator at 70–80 p.s.i. In approximately seven hours, reaction was considered complete. A total of 45 pounds of methyl chloride had been added to the polyamine. The product of polyquaternary was then cooled, vented, and drummed for use.

Other runs involving amines other than ammonia such as ethylene diamine and diethylene triamine may also be reacted with ethylene dichloride or other alkylene dihalides as described above to give products having a substantially higher molecular weight and lower proportion of ring structure than heretofore achievable.

The products derived from the just described process in the invention are extremely useful as coagulants. Particularly, it has been noted that the polyamines and polyquaternaries of the invention are useful in coagulating sewage wastes and low turbidity waters. To effect coagulation, all that is necessary is to add the products of the invention to the liquid containing the suspended solids which are to be removed. The suspended solids so agglomerated by action of the polynitrogen compounds are then merely separated from the suspending liquid by, for example, allowing them to settle out by gravity force, or by filtration techniques.

As just indicated, the polyamine products of the invention and polyquaternary derivatives are especially useful in coagulating and producing settling of sewage wastes and finely divided solids which are predominantly inorganic and are present in concentrations of 15 p.p.m. to 30,000 p.p.m. by weight of the total suspension in water. Sewage suspensions are well-known and need little elaboration. The second class of substances, normally termed "low turbidity water suspension" and possessing the just recited characteristics, generally are classified in opposition to heavy slurries. While the products of the invention have activity in coagulating heavy slurry materials which generally contain 7–70% by weight of suspended solids, their coagulant activity is surprisingly superior in the fields of sewage suspensions and low turbid waters.

The dosage levels to achieve good coagulation activity may be as little as 10 p.p.m. of polyamine or polyquaternary product in terms of active organic solid present. More preferably, dosages vary from 10 to about 1000 p.p.m. with the most preferred range being 10–100 p.p.m.

Comparison was made between the polyamine products formed by the techniques of the instant invention and those synthesized by prior art techniques. In this study, respective coagulant activities were tested on both sewage waste and low turbidity water samples. The higher molecular weight polyamine products of the invention, substantially non-cyclic in nature, and formed in the manner set out in the instant invention had 25–200% increases in coagulant efficiency over prior art polyamine materials, even though molar ratios of amine reactant as ammonia and alkylene dihalide as ethylene dichloride and other process variables were the same in each case. When the total amounts of reactants are added at one time rather than as taught here and the reaction caused to proceed even under high pressures and temperatures, the polyamine products did not approach the molecular weight levels or coagulant activities of those products synthesized by the instant method. Even when following the teachings of the invention, but with omission of the continuous neutralization step over at least the terminal 60% of reaction time, the final achieved products have substantially less coagulant efficiency especially in the just-mentioned two areas of coagulation endeavor. Both in terms of clearer supernatant liquids and more rapidly formed flocs of previously suspended solids, the polyamines and polyquaternaries of the invention showed clear superiority over prior art substances of like structure though of lower molecular weight and/or higher proportion of ring structure.

Obviously, many modifications and variations of the invention as hereinbefore set forth, may be made without departing from the spirit and scope thereof, and, therefore, only such limitations should be imposed as are indicated in the appended claims.

The invention is hereby claimed as follows:

1. The process of making high molecular weight polyamines characterized as being substantially non-cyclic in structure, which comprises the steps of reacting an alkylene dihalide selected from the group consisting of ethylene and 1,2-propylene dihalides with an amine having the following structural formula:

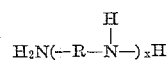

where R is an alkylene radical selected from the group consisting of

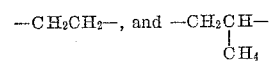

and $x$ is an integer of 0–5, said reaction being carried out at a temperature ranging from 75° C. to 200° C., and under a pressure of 75–1000 p.s.i. by slowly introducing said amine into a reaction zone at a rate sufficient to maintain a fixed predetermined pressure within said limits, simultaneously introducing said alkylene dihalide into said reaction zone at a rate sufficient to maintain a fixed predetermined temperature within said limits, and continuously introducing into said reaction zone during at least the terminal 60% of the time of reaction sufficient basic reagent selected from the group consisting of alkali and alkaline earth hydroxides, oxides and carbonates to maintain the reaction pH between about 8.0 and 12.5.

2. The process of claim 1 wherein said introduction of basic reagent is effected during the whole of said reaction.

3. The process of claim 1 wherein sufficient basic reagent is added to maintain the reaction pH between about 9.0 and 12.0.

4. The process of claim 1 wherein said amine is ammonia and said alkylene dihalide is ethylene dichloride.

5. The process of making high molecular weight polyamines characterized as being substantially non-cyclic in structure which comprises the steps of reacting an alkylene dihalide selected from the group consisting of ethylene and 1,2-propylene dihalides with an amine having the following structural formula:

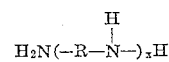

where R is an alkylene radical selected from the group consisting of

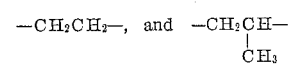

and $x$ is an integer of 0–5, said reaction being carried out at a temperature ranging from 75° C to 200° C. and under a pressure of 75–1000 p.s.i. by slowly introducing said amine into a reaction zone at a rate sufficient to maintain a fixed predetermined pressure within said limits, simultaneously introducing said alkylene dihalide into said reaction zone at a rate sufficient to maintain a fixed predetermined temperature within said limits while continuously applying a source of external cooling to said reaction zone, continuously introducing into said reaction zone during at least the terminal 60% of the time of reaction sufficient basic reagent selected from the group consisting of alkali and alkaline earth hydroxides, oxides and carbonates to maintain the reaction pH between about 8.0 and 12.5, and terminating said reaction at a point when reactor volume has been substantially filled with reaction product.

6. The process of claim 5 wherein said amine is ammonia and said alkylene dihalide is ethylene dichloride.

7. The process of claim 6 wherein sufficient basic reagent is added to maintain the reaction pH between about 9.0 and 12.0, and said introduction of basic reagent is effected during the whole of said reaction.

8. The process of making high molecular weight polyamines having an average molecular weight in excess of 1000 and being further characterized as being non-cyclic in structure, which comprises the steps of reacting in presence of at least 10% by weight of water based on final product weight, ethylene dichloride with ammonia, said reaction being carried out at a temperature ranging from 75° C. to 200° C., and under a pressure of 75–1000 p.s.i. by slowly introducing said ammonia into a reaction zone at a rate sufficient to maintain a fixed predetermined pressure within said limits, simultaneously introducing said ethylene dichloride into said reaction zone at a rate sufficient to maintain a fixed predetermined temperature within said limits while continuously applying a source of external cooling to said reaction zone, and also continuously introducing into said reaction zone during at least a terminal 60% of the time of reaction sufficient basic reagent selected from the group consisting of alkali and alkaline earth hydroxides, oxides and carbonates to maintain the reaction pH between about 8.0 and 12.5, terminating said reaction at a point when reactor volume has been substantially filled with product, and removing the inorganic salt by-product from the water solution of polyamine product containing 20–60% by weight of polyamine solids.

9. The process of claim 8 wherein said reaction product is formed by reaction of 1–2.5 moles of ammonia per mole of ethylene dichloride.

10. The method of claim 8 wherein said salt by-product is removed from said polyamine product by centrifugation.

References Cited

UNITED STATES PATENTS

| | | | |
|---|---|---|---|
| 2,040,061 | 5/1936 | Munz | 260—583 |
| 2,268,620 | 1/1942 | Rigby | 260—2 |
| 2,279,294 | 4/1942 | Hardman | 260—583 |
| 2,765,229 | 10/1956 | McLaughlin | 260—2 |
| 2,769,841 | 11/1956 | Dylewski et al. | 260—585 |
| 2,834,675 | 5/1958 | Jen et al. | 260—2 |
| 2,995,512 | 8/1961 | Weidner et al. | 210—54 |
| 3,203,910 | 8/1965 | Wilson | 260—2 |
| 3,215,625 | 11/1965 | Dunning et al. | 260—2.1 |
| 3,219,578 | 11/1965 | Cruickshank et al. | 260—2 |
| 3,251,778 | 5/1966 | Dickson et al. | 260—2 |

SAMUEL H. BLECH, *Primary Examiner.*

UNITED STATES PATENT OFFICE
CERTIFICATE OF CORRECTION

Patent No. 3,372,129                                   March 5, 1968

Kenneth G. Phillips

It is certified that error appears in the above identified patent and that said Letters Patent are hereby corrected as shown below:

Column 2, line 35, "sturctural" should read -- structural --. Column 5, line 76, "non-cycle" should read -- non-cyclic --. Column 8, lines 25 and 26, the right-hand portion of the formula should appear as shown below:

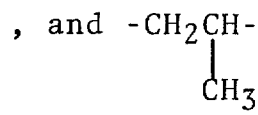

Column 10, line 3, "llled" should read -- filled --.

Signed and sealed this 25th day of November 1969.

(SEAL)
Attest:

EDWARD M. FLETCHER, JR.                     WILLIAM E. SCHUYLER, JR.
Attesting Officer                              Commissioner of Patents